(No Model.) 2 Sheets—Sheet 1.
H. WERNER.
DOUGH KNEADING MACHINERY.
No. 329,110. Patented Oct. 27, 1885.
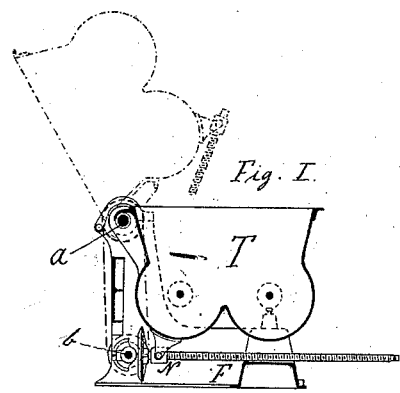
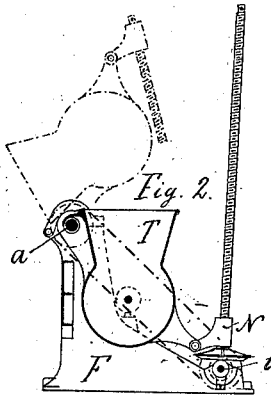
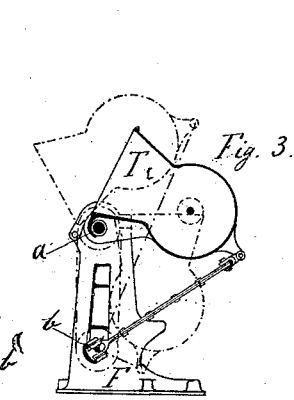
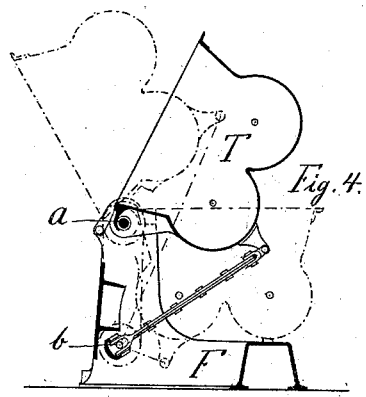
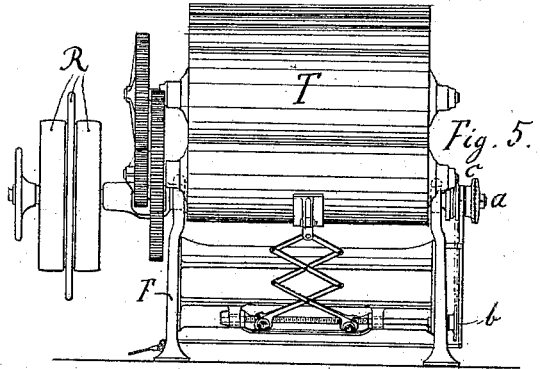
Hermann Werner.

(No Model.) 2 Sheets—Sheet 2.
H. WERNER.
DOUGH KNEADING MACHINERY.
No. 329,110. Patented Oct. 27, 1885.
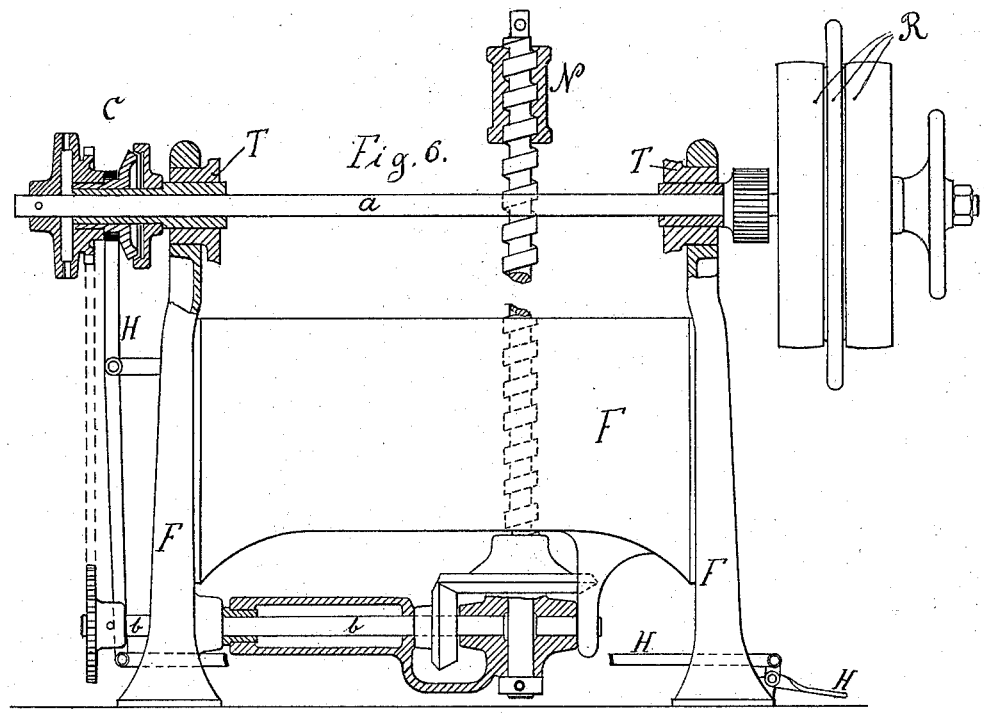
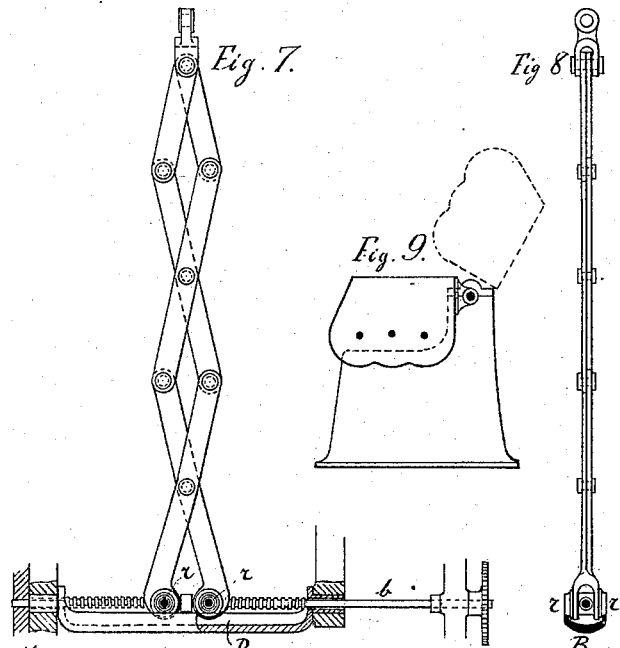
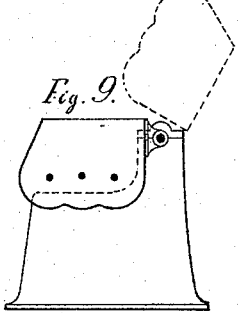
Henry J. Blakeway
Charles H. LeGarrick
Hermann Werner.

UNITED STATES PATENT OFFICE.

HERMANN WERNER, OF CANNSTADT, WÜRTEMBURG, GERMANY.

DOUGH-KNEADING MACHINERY.

SPECIFICATION forming part of Letters Patent No. 329,110, dated October 27, 1885.

Application filed May 15, 1884. Serial No. 131,561. (No model.)

*To all whom it may concern:*

Be it known that I, HERMANN WERNER, of the firm of Werner & Pfleiderer, of Cannstadt, Würtemburg, Germany, have invented new and useful Dough-Kneading Machinery for Bread and other Dough or Plastic Material, of which the following is a specification.

This invention relates to improvements in dough-kneading machinery. One object of my improvement is to enable the machine to discharge its contents on the level at which the charge is introduced into the machine.

My invention consists, essentially, in pivoting the trough or mixing-vessel at or near its top, and in combining it with mechanism for lifting said vessel and the stirrer therein, and tilting the vessel around said top pivot, as hereinafter described.

Figure 1, Sheet I, is a side view of a double trough (such as shown in Patents Nos. 254.042 and 212,738) having my invention. Fig. 2, Sheet I, is a similar view of a single-trough machine. Fig. 3, Sheet I, is a side view of the same machine as Fig. 2, but showing a modification of the lifting mechanism. Fig. 4 is a side view of a similar modification of the machine shown in Fig. 1, and Fig. 5 is a face view of the same. Fig. 6 is an enlarged face view, partly in section, of the lifting mechanism shown in Fig. 1. Figs. 7 and 8 are face and edge views, respectively, of the lifting mechanism shown in Fig. 5. Fig. 9 is a diagram showing another form of trough to which my invention can be applied.

T is the trough of the machine, which is of suitable form and size; F, its frame or stand. The trough is at or near its top pivoted by the shaft $a$ to the frame F. This shaft $a$ may also be the driving-shaft for transmitting rotary motion to the stirrer-shaft, which is hung in the trough T. A friction-coupling, C, on the shaft $a$ may also connect by a belt or chain with a counter-shaft, $b$, which forms the swivel or fulcrum for the lifting-gear for tilting the trough T. This lifting-gear consists of a long screw geared to the shaft $b$ and turning in a nut, N, which is hinged to the trough T. By pressing on the lever H the shaft $b$ becomes coupled with the driving-shaft $a$, by which it is now revolved. For emptying the trough, the shaft $a$ is turned in such a direction that when the said screw is turned it will draw the nut N away from $b$, thereby causing the trough T to be lifted up and tilted around $a$, and the attendant has it in his power to stop or reverse this movement at any desired moment. Figs. 1 and 2 show the trough tilted in dotted lines.

The mixing-blades are driven from a pinion on the shaft $a$, quite independently from the lifting-gear.

The link mechanism, Figs. 5, 7, and 8, is merely a substitute for the screw tilting gear, Fig. 6, and in this case a right-and-left-handed screw cut on counter-shaft $b$ enables the attendant to cause the two lower ends of the lazy-tongs to approach or to recede from each other, thereby forcing the upper end of said lazy-tongs up or down, as may be desired.

Fig. 9 shows a form of trough which is adapted to contain three stirrers, but which is also hinged at the top in conformity with my present invention. I do not, however, limit myself to any special mechanism for tilting the trough.

I do not claim tilting the trough on the axis of its mixing-blade, whereby the point of discharge is brought below the level at which the charge is introduced.

I claim as my invention—

The kneading-trough T, having mixing-blades, in combination with the pivot $a$ near its upper end, and with tilting and lifting mechanism for swinging said trough and raising its stirrer-shaft around said upper pivot, and with mechanism for revolving said stirrer-shaft from the axis of said pivot $a$, so that said trough can be charged and emptied on the plane substantially of said pivot $a$, substantially as herein shown and described.

HERMANN WERNER.

Witnesses:
 HENRY I. BLAKEWAY,
 CHARLES H. LE GASSICK.